United States Patent [19]
Lin et al.

[11] Patent Number: 4,578,578
[45] Date of Patent: Mar. 25, 1986

[54] METHOD FOR CORRECTING SPECTRUM SHIFT

[75] Inventors: Chew-Chen Lin, Houston; Frank L. Lankford, Jr., Bellaire, both of Tex.

[73] Assignee: Texaco Inc., White Plains, N.Y.

[21] Appl. No.: 557,804

[22] Filed: Dec. 5, 1983

[51] Int. Cl.⁴ ............................................. G01B 18/00
[52] U.S. Cl. .................................. 250/252.1; 250/269
[58] Field of Search ............................ 250/252.1, 269

[56] References Cited

U.S. PATENT DOCUMENTS

| | | | |
|---|---|---|---|
| 3,270,205 | 2/1963 | Zadd et al. | 250/369 |
| 3,922,541 | 11/1975 | Seeman | 250/252.1 |
| 4,031,367 | 6/1977 | Murphy | 250/262 |
| 4,055,763 | 10/1977 | Antkiw | 250/270 |
| 4,220,851 | 9/1980 | Whatley, Jr. | 250/252.1 |
| 4,272,677 | 6/1981 | Berthold et al. | 250/252.1 |
| 4,403,145 | 9/1983 | Stevens et al. | 250/252.1 |

FOREIGN PATENT DOCUMENTS 973640 8/1975 Canada .............................. 250/269

*Primary Examiner*—Alfred E. Smith
*Assistant Examiner*—Richard Hanig
*Attorney, Agent, or Firm*—Robert A. Kulason; Ronald G. Gillespie

[57] ABSTRACT

A method which evaluates at least one subject element includes detecting radiation from a plurality of elements including the subject element. Data pulses are provided which are representative of the detected radiation. A spectrum is derived from the data pulses and a shift of the spectrum is determined. The subject element is evaluated in accordance with the energy level of data pulses occurring in a region of interest associated with the subject element which are derived from with the spectrum and the determined shift of the spectrum.

16 Claims, 9 Drawing Figures

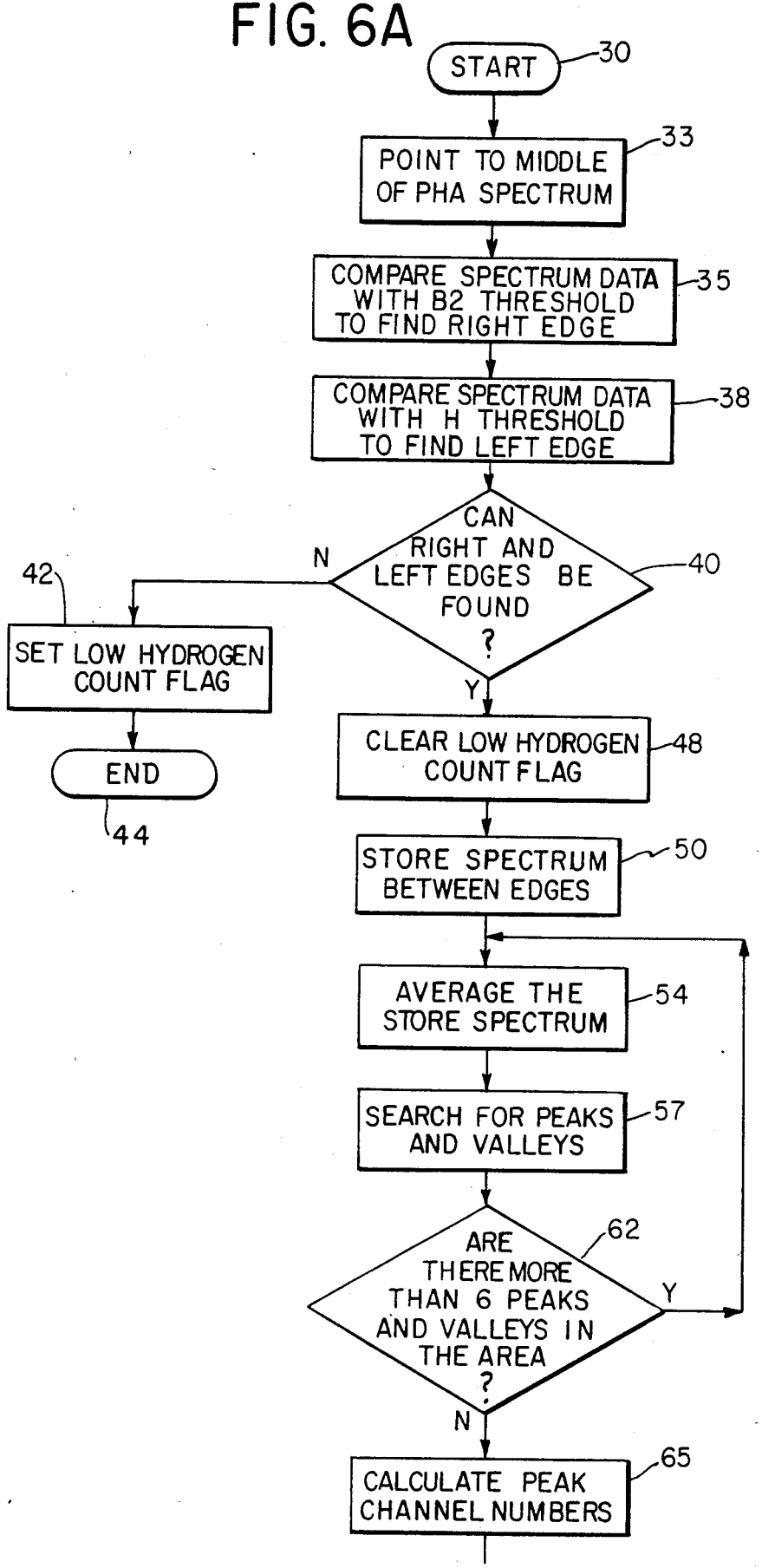

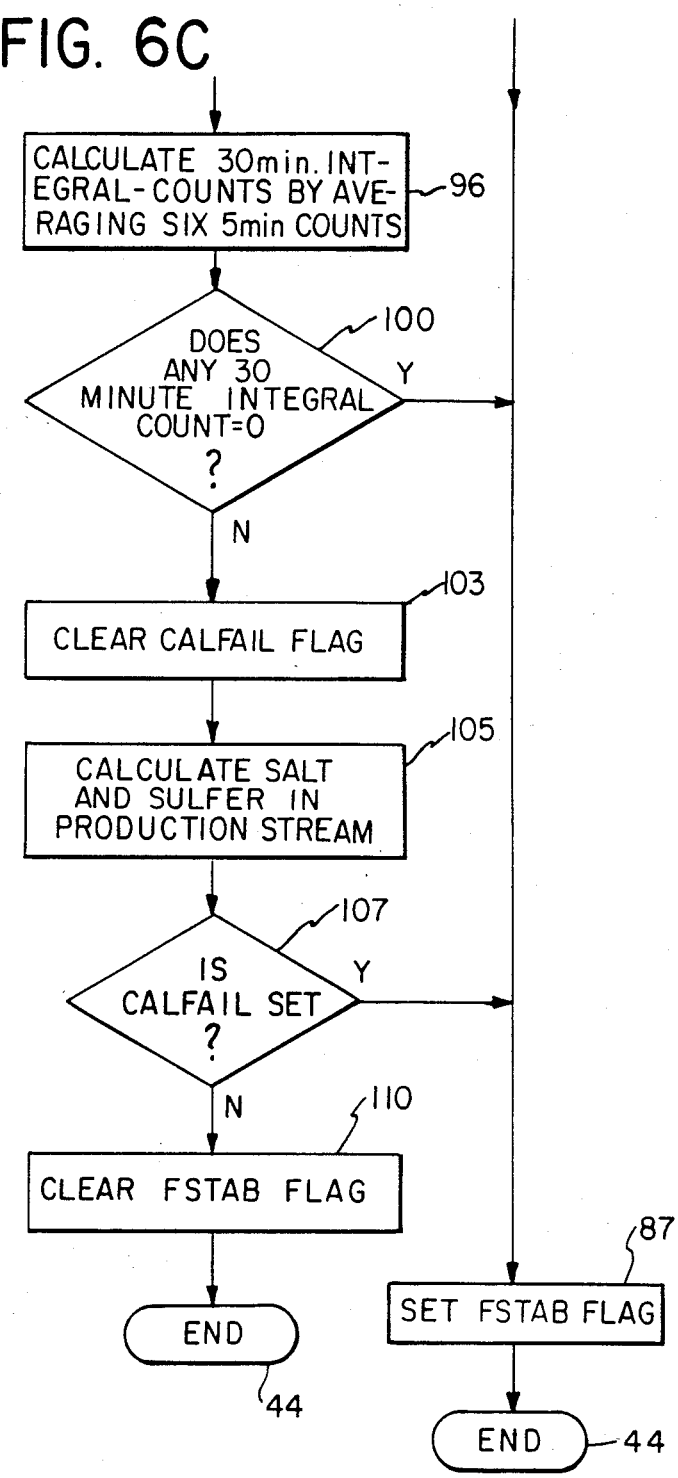

4,578,578

METHOD FOR CORRECTING SPECTRUM SHIFT

BACKGROUND OF THE INVENTION

Field of the Invention

The present invention relates to the detection of radiation in general and more particularly to those radiation detection systems utilizing a pulse height analyzer.

SUMMARY OF THE INVENTION

A method which evaluates at least one subject element includes detecting radiation from elements including the subject element. Data pulses are provided which are representative of the detected radiation. A spectrum is derived from the data pulses and a shift of the spectrum is determined. the subject element is evaluated in accordance with the energy level of data pulses occurring in a region of interest associated with the subject element derived from the spectrum and the determined shift of the spectrum.

The object and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and not to be construed as defining the limits of the invention.

DESCRIPTION OF THE DRAWINGS

FIGS. 6A, 6B and 6C depict a simplified flow diagram of the programming of the computer shown in FIG. 1.

DESCRIPTION OF THE INVENTION

Figure 1:
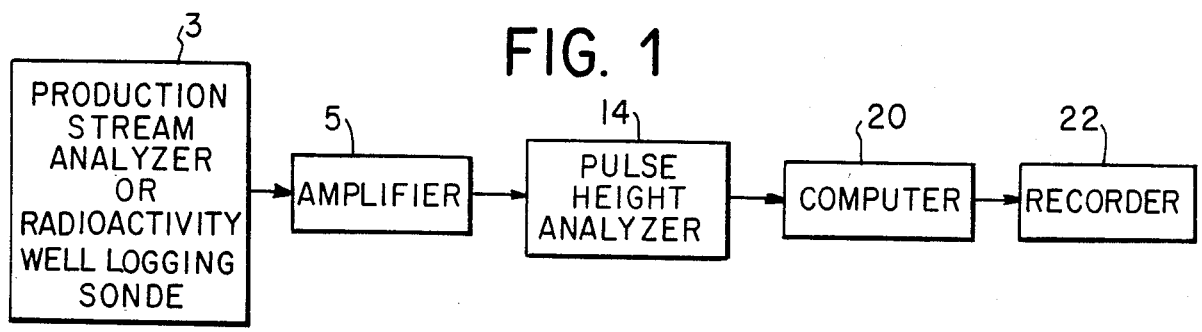
FIG. 1 is a simplified block diagram of a radiation detection system with which the present invention may be practiced.

With reference to FIG. 1, a production stream analyzer or a radioactivity well logging sonde 3 provides reference pulses and data pulses to an amplifier 5. The data pulses correspond to detected radiation. By way of example, a production stream analyzer is described and disclosed in U.S. Pat. No. 4,200,789 while a radioactivity well logging sonde is described and disclosed in U.S. Pat. No. 4,220,851. It should be noted that in regard to the radioactivity well logging sonde, there may be multiple radiation detectors involved in which case there would necessarily be additional circuitry to handle the additional detectors.

Amplifier 5 amplifies the reference pulses and the data pulses. The amplified data pulses are provided to a multi-channel pulse height analyzer 14 which counts the number of pulses occurring and provides a corresponding output to a computer 20. Computer 20 provides an output which is recorded by recorder 22. The output from computer 20, when used with a production stream analyzer, would be representative of the content of an element of the production stream such as a percentage volume of water or salt in a production stream which is derived from the counts of pulses in the different channels of analyzer 14. When used with a the radioactivity well logging sonde, the output of computer 20 would be representative of characteristics of the earth formation normally associated with the exploration for hydrocarbons.

Figure 2:
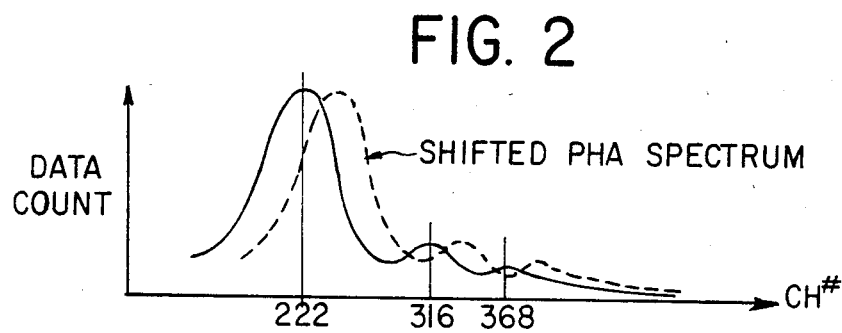
FIG. 2 is a graphical representation of a spectrum obtained by the system of FIG. 1 and also shows a shifted spectrum.

All of the foregoing, as can be seen from the cited patents, represents the prior art. However, due to the variation of the temperature surrounding the nuclear detector and the gain drifting of the analog signal amplifier, the pulse height analyzer 14 spectrum data are often found shifted as is shown in FIG. 2, where the dashed line represents the shifted spectrum. Because of the drifting of the specturm, regions of interest which for the production stream analyzer would be hydrogen, sulfur, and chlorine required for determining the salt content of a production stream of crude oil are changed. Unless the pulse height analyzer 14 is calibrated for those three elements, the salt and sulfur result will be deviated. Heretofor, the calibration was done manually to stabilize the spectrum data from pulse height analyzer 14.

Figure 3:
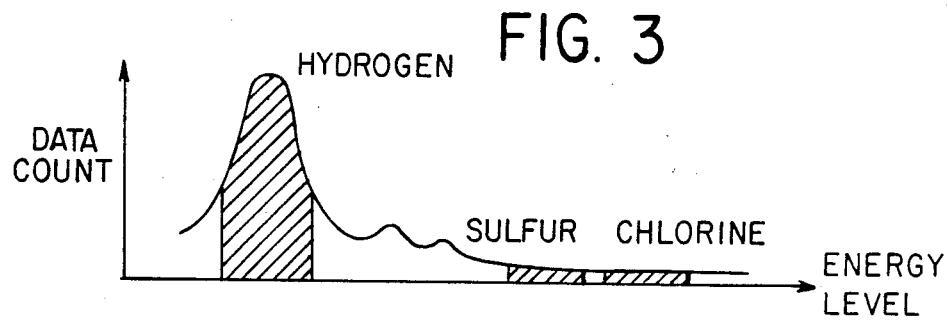
FIG. 3 is a graphical representation of the spectrum obtained from a system of FIG. 1 showing regions of interest for Hydrogen, Sulfur and Chlorine.
Figure 4A:
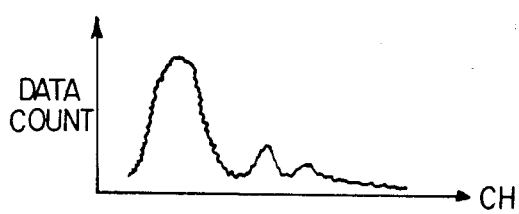
FIGS. 4A and 4B are graphical representations of the spectrum prior to and after a smoothing operation respectively.
Figure 4B:
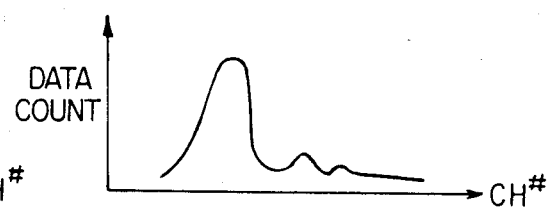

With reference to FIG. 3, the hydrogen region of interest in the spectrum data from pulse height analyzer 14 is between 2.05 MEV and 2.50 MEV, the sulfur region of interest in the spectrum data is between 5.00 MEV and 5.74 MEV, while the chlorine region of interest in the spectrum data is between 5.76 MEV and 8.00 MEV. The method of the present invention utilizing computer 20 and starts with hydrogen, the first boron (first escape), and the second boron (primary) peak searches. It should be noted that due to the statistical nature of the data, the nuclear data spectrum is not smooth and as a result there are several maximum points around the hydrogen, first boron and second boron peaks. By definition the maximum point is a point on a curve at which there exists a horizontal tangent line at which maximum data count around this neighborhood. The spectrum data are smoothed by averaging until only three maximum points appearing in the area shown in FIGS. 4A and 4B. The effect of the smoothing operation may be shown in FIGS. 4A and 4B where FIG. 4A is the spectrum data prior to smoothing and FIG. 4B shows the spectrum after smoothing. Thus the peak is the mean of several channels around the maximum point.

Figure 5:
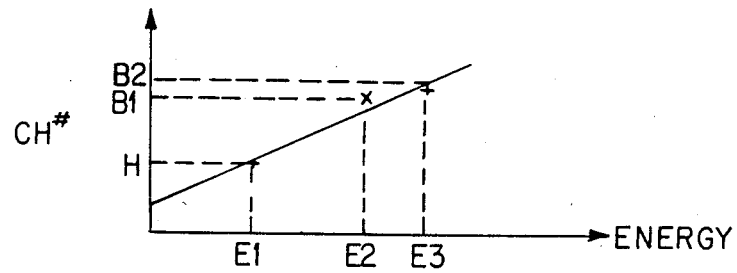
FIG. 5 is a plot of a least square fit line for the Hydrogen and first and second boron peaks on a channel number vs. energy coordinate system.

The energy levels of levels E1, E2 and E3, corresponding to the hydrogen peak, the first boron peak B1 and the second boron peak B2, respectively, are know. The relationship between channel number and energy level can be derived by the least square fit of the three peaks H, B1 and B2 as shown in FIG. 5. Since the energy levels of the hydrogen, sulfur and chlorine regions of interests are known, the channel numbers for the shifted regions of interest can be determined by the computer from the least square fit line.

With reference to FIG. 6, a simplified flow diagram for the programming of Computer 20 includes the start block 30 where data from pulse height analyzer 14 is entered into Computer 20. The next step is to point to the middle of the pulse height analyzer 14 spectrum as represented by block 33. In this operation the operator picks a centrally located channel. For example, for a pulse height analyzer 14 having 1,024 channels, the programmers point for channel No. 512.

The spectrum data is then compared with the B2 threshold to find the right edge of the spectrum as represented by block 35. The spectrum data is compared with the Hydrogen threshold to find the left edge of the spectrum, by block 38. Computer 20 is then queried as to whether the right and left edges can be found (block 40). If the answer is no, block 42 requires the setting of a low Hydrogen count flag which also results in the end of the routine represented by block 44. If the answer is yes then, as required by block 48, the low Hydrogen count flag is cleared.

The next step is to store that portion of the spectrum occurring between the edges as represented by block 50. The stored spectrum is averaged in block 54 and a search for peaks and valleys is conducted by computer 20, see block 57. Computer 20 is then queried, "are there more than 6 peaks and valleys in the area" as shown in block 62. If the answer is yes, the data is returned for further processing by block 54 and further searching by block 57. This procedure keeps up until the answer to the querie of block 62 is that there are not more than 6 peaks and valleys in the area.

At that time, peak channel numbers are calculated as per block 65. Block 68 requires that the channel numbers for those peak channels be stored. Block 69 provides for the adjustment of the three peaks. Based on probabilities, Computer 20 calculates the peaks as required in block 72. Block 75 states that a parabolic curve fit to a finite H peak is performed using the several data channels around Hydrogen peak. A least square fit line is determined as per block 78. Based on the least square fit line, the Hydrogen, Chlorine and Sulfur regions of interest are determined as per block 82.

Computer 20 is then queried, "Is the left boundary of the Hydrogen region of interest greater than 150", as shown in block 86. If the answer is no, block 87 requires the setting of the FSTAB flag which results in the end of the program 44. The FSTAB flag signifies that the unit has failed stabilization and the data currently presented should not be used. If the answer to the querie of block 86 is yes, Computer 20 is then queried, to see if the right boundary of the chlorine region of interest is greater than 1000. If the answer to that query is yes, then we proceed to the setting of the FSTAB flag as per block 87.

If the answer is no, block 91 requires the calculation of the Hydrogen, Sulfur and Chlorine using 5 minute integral counts, using the regions of interest. Again Computer 20 is queried as per block 94. "Does any integral count equal O"? If the answer is yes, the FSTAB flag is set. If the answer is no we proceed to the next step which is to calculate thirty minute integral counts by averaging 6 five minute counts as set forth in block 96.

Computer 20 is again queried, "Does any 30 minute integral count equal 0?" as shown in block 100. If the answer is no this simply means that the data is good and ends that portion of the program dealing with the adjustments to pulse height analyzer 14 data. Spectrum block 105 requires the calculation of the salt and sulfur in the production stream as provided for in the aforementioned U.S. Patent using the Salt-in-Crude monitor. After this calculation, Computer 20 is then queried. "Is Calfail set", as provided for in block 107, Calfail stands for calibration failed. If the answer is yes, the FSTAB flag is again set. If the answer is no, the next step as provided for by block 110 is to clear the FSTAB flag. Proceed to the end of routine 44.

Figure 6B:
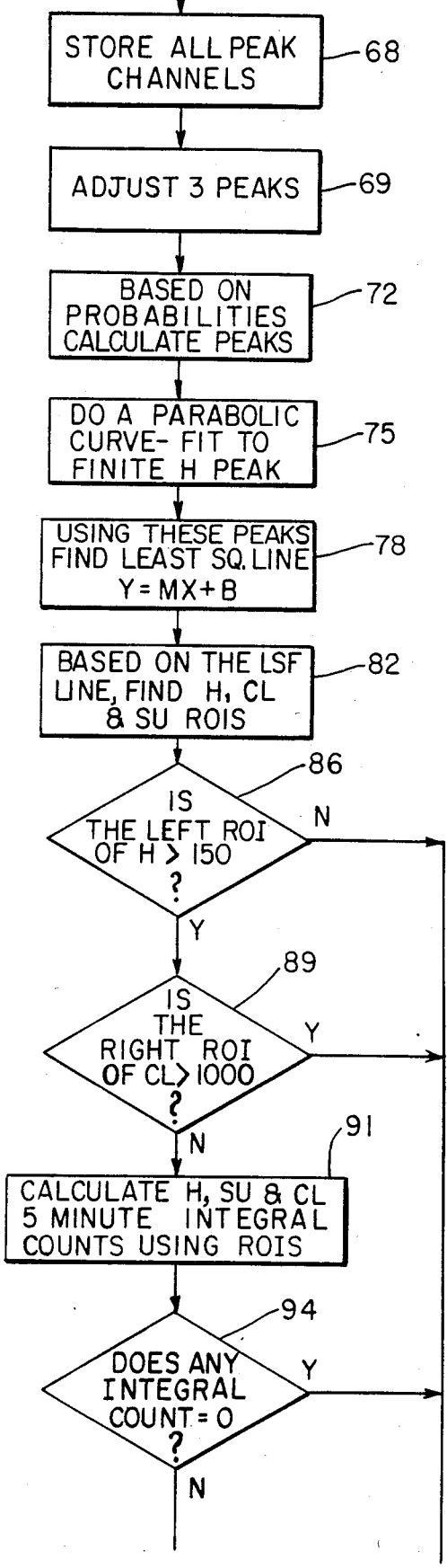

As noted, the aformentioned flow diagram of FIGS. 6A, 6B and 6C is applicable to the system of FIG. 1 where the production stream analyser is used. A similar program would be developed for a radioactivity well logging system.

When the method of the present invention is used in radioactive well logging, the method is the same but the elements for yielding the these peaks are different. For example, with a well logging system described and disclosed in U.S. Pat. No. 4,032,778; 4,032,780 and 4,035,640. The peaks searched for are the TL-208 peak (2.615 MEV) is from the Thorium source inside the detector, the primary oxygen peak (6.13 MEV), and the Oxygen first escape peak (5.62 MEV). The two oxygen peaks are derived from gamma radiation from water flowing behind the casing.

The present invention as herein before described is method of automatically correcting far spectrum drift of the spectrum provided by a pulse height analyzer receiving pulses from a radiation detector.

What is claimed is:

1. A method for evaluating at least one subject element comprising the steps of:
   detecting radiation from a plurality of elements including the subject element;
   providing data pulses representative of the detected radiation;
   deriving a spectrum from the data pulses;
   determining a shift of the spectrum; and
   evaluating the subject element as functionally related to an energy level of data pulses occurring in a region of interest associated with the subject element in accordance with the spectrum and the determined shift of the spectrum.

2. A method as described in claim 1 in which the shift determining step includes:
   finding at least three peaks of known elements, and
   deriving the spectrum shift from the locations of the three peaks.

3. A method as described in claim 2 in which the spectrum shift deriving step includes:
   deriving a least square fit line for the three peaks in relation to energy level and channel numbers; and
   in which the deriving the counts of data pulses step includes:
   defining the region of interest of the subject element in accordance with the least square fit line and a known energy level of the subject element.

4. A method as described in claim 3 in which the finding step includes:
   searching for peaks,
   averaging the spectrum when more than three peaks are found, and
   repeating the next two previously mentioned steps until the searching step yields three peaks.

5. A method as described in claim 4 in which the known elements are hydrogen and boron.

6. A method as described in claim 4 in which the known elements are thorium and oxygen.

7. A method for correcting spectrum drift in a radioactive well logging system including at least one radiation detector which provides data pulses representative of detected radiation, which comprises the steps of:
   deriving a spectrum from the data pulses,
   determining a shift of the specturm, and evaluating the spectrum in accordance with the determined shift of the spectrum.

8. A method as described in claim 7 in which the shift determining step includes:
    finding at least three peaks of know elements, and
    deriving the spectrum shift from the locations of the three peaks.

9. A method as described in claim 8 in which the spectrum shift deriving step includes:
    deriving a least square fit line for the three peaks in relation to energy level and channel numbers; and
    in which the deriving the counts of data pulses step includes:
    defining the region of interest of the subject element in accordance with the least square fit line and a known energy level of the subject element.

10. A method as described in claim 9 in which the finding step includes:
    searching for peaks,
    averaging the spectrum when more than three peaks are found, and
    repeating the next two previously mentioned steps until the searching step yields three peaks.

11. A method as described in claim 10 in which the known elements are thorium and oxygen.

12. With a system that monitors the quantity of at least one constituent of a crude oil production stream in which the production stream is irradiated with neutrons and gamma radiation from the production stream is detected which comprises the steps of:
    providing data pulses representative of the detected gamma radiation,
    deriving a spectrum from the data pulses,
    determining a shift of the spectrum, and
    analyzing the spectrum to quantitatively determine the constituents of the production stream in accordance with the spectrum shift.

13. A method as described in claim 12 in which the shift determining step includes:
    finding at least three peaks of known elements, and
    deriving the spectrum shift from the locations of the three peaks.

14. A method as described in claim 13 in which the spectrum shift deriving step includes:
    deriving a least square fit line for the three peaks in relation to energy level and channel numbers; and
    in which the deriving the counts of data pulses step includes:
    defining the region of interest of the subject element in accordance with the least square fit line and a known energy level of the subject element.

15. A method as described in claim 14 in which the finding step includes:
    searching for peaks,
    averaging the spectrum when more than three peaks are found, and
    repeating the next two previously mentioned steps until the searching step yields three peaks.

16. A method as described in claim 15 in which the three peaks are associated with hydrogen and boron.

* * * * *